(No Model.) 2 Sheets—Sheet 1.

W. STANLEY & F. DARLINGTON.
MEANS FOR SUPPORTING ROTATING SHAFTS.

No. 588,666. Patented Aug. 24, 1897.

WITNESSES:
Frank S. Ober
James S. Oswald.

INVENTORS:
William Stanley,
Frederick Darlington.
BY H. B. Brownell,
ATTORNEY

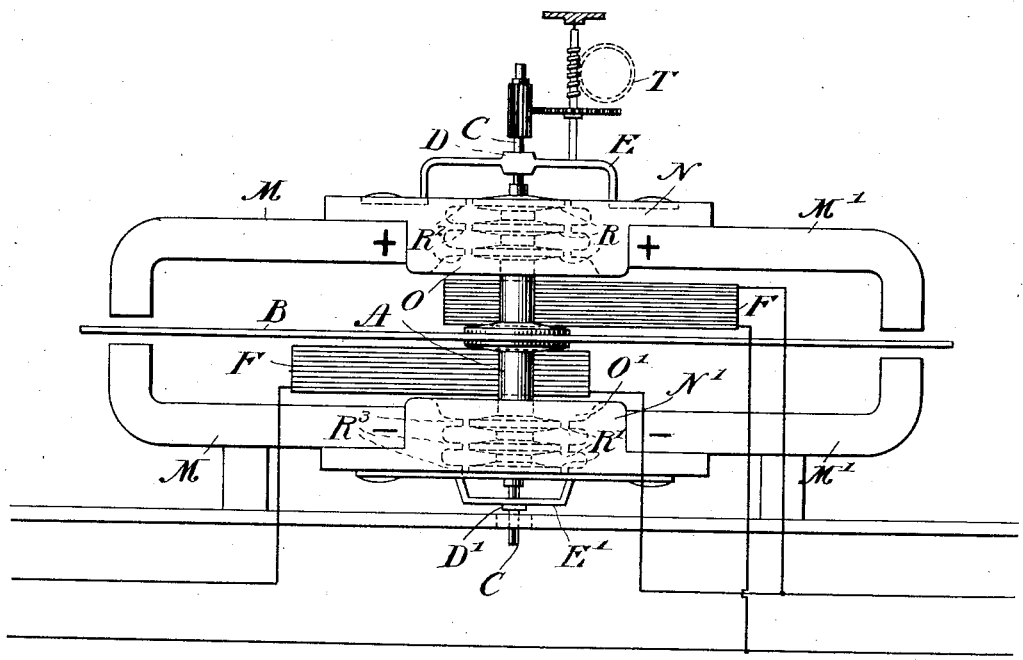

UNITED STATES PATENT OFFICE.

WILLIAM STANLEY AND FREDERICK DARLINGTON, OF PITTSFIELD, MASSACHUSETTS.

MEANS FOR SUPPORTING ROTATING SHAFTS

SPECIFICATION forming part of Letters Patent No. 588,666, dated August 24, 1897.

Application filed May 5, 1897. Serial No. 635,136. (No model.)

*To all whom it may concern:*

Be it known that we, WILLIAM STANLEY and FREDERICK DARLINGTON, citizens of the United States, residing in the city of Pittsfield, county of Berkshire, and State of Massachusetts, have invented certain new and useful Improvements in Means for Supporting Rotating Shafts, of which the following is a specification.

Our invention relates to revolving shafts and means for supporting the same in journals, and has for its object to so support the shaft that the end thrust shall be balanced or opposed under normal conditions, being resisted by a magnetic action hereinafter described. Briefly, our invention may be termed a "magnetically-suspended" shaft. We have found it particularly useful in connection with meters where the shaft has longitudinal vibration. In many mechanical appliances, such as meters, the shaft carrying the revolving armature is mounted upon jewels to reduce the friction. If, however, there is a vibratory thrust against such jewels, they are in a comparative short time worn, causing injurious friction. In making our invention we have solved the problem of how to avoid this destruction of the jewels.

We have illustrated our invention in a meter in which there is an end thrust on a continuously-revolving shaft and anticipate that it may be of great utility in other applications as well.

Our invention involves a practical application of a well-known scientific fact that a coil of wire when energized forms a magnetic system which will support an iron core within its center. In practice instead of a coil we preferably use a magnetic system consisting of a permanent magnet or magnets which will produce substantially the same magnetic effects as an energized coil.

The following is a description of our invention, reference being had to the accompanying drawings, in which—

Figure 1:
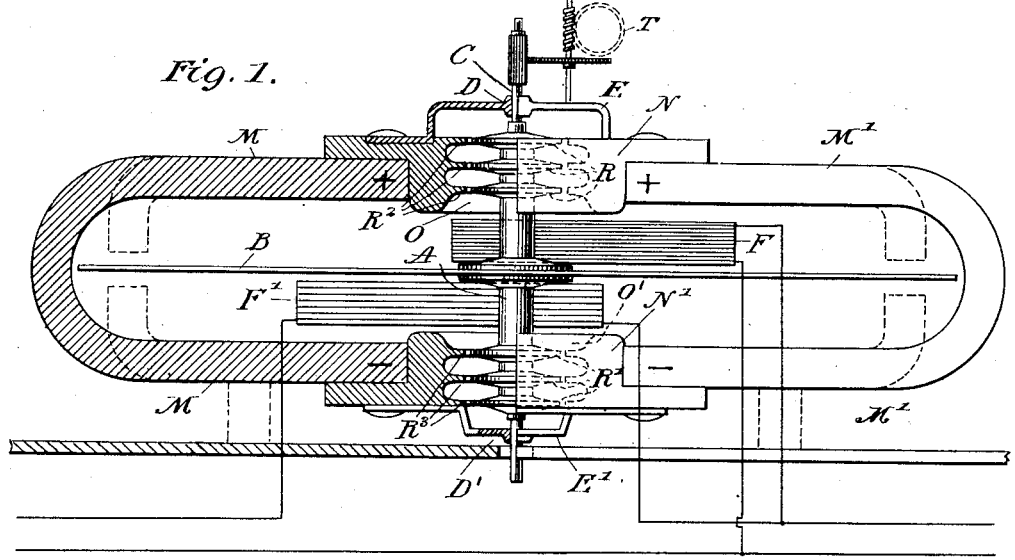
Figure 2:
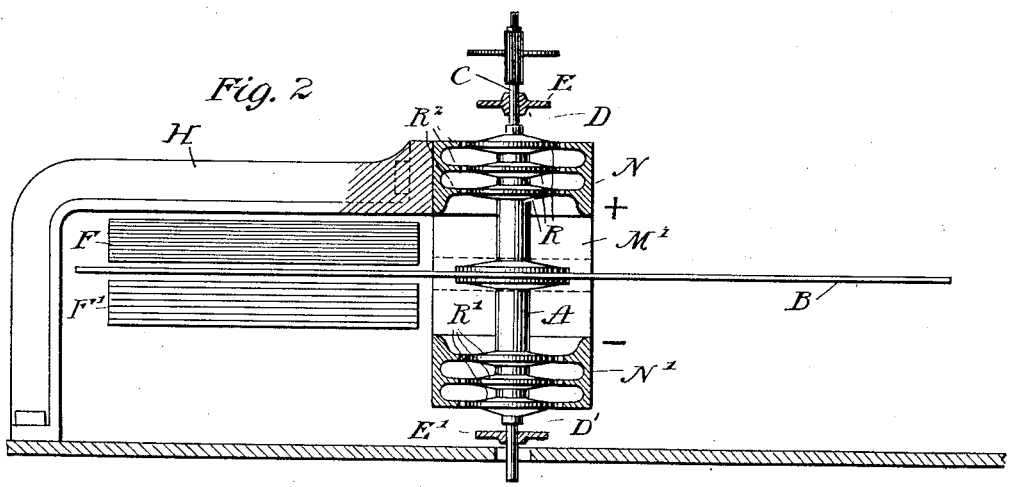
Figure 3:
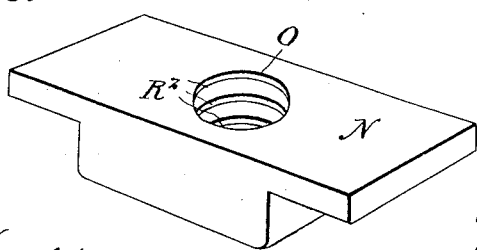

Figure 1 is a front elevation of a meter embodying our invention, partly in section. Fig. 2 is a side elevation of the same, partly in section. Fig. 3 is a detail view of one of the parts. Fig. 4 shows a modification.

In the apparatus shown, M M' are two permanent magnets, whose like poles are opposed to one another and connected by pole-pieces or yokes N N', having circular openings O O', which serve to receive and radiate the resultant magnetic flux to the armature A, which constitutes the shaft to be supported. The magnetic system is supported by a suitable arm H. The armature or shaft A consists of a round symmetrical stem of magnetic material, with one or more projecting rings R R and R' R' at each end, as shown, and supports the movable portion of the instrument, which in the present case is a rotating disk B of an induction-meter.

At each end of the shaft A is a staff or bearing C, with the axes of which the magnetic armature A and the rotating disk B are concentric. These bearings C are highly polished and are guided in ring-journals D D', preferably jeweled, which are supported from the pole-pieces N N' by brackets E E'. These journals D D' are concentric with the orifices O O' in the pole-pieces N N' and serve to keep the shaft or armature A in the center of the said orifices O O', but in no way tend to sustain the weight of the armature and moving parts.

In the interior of each of the orifices O O' of the pole-pieces N N' are rings $R^2$ $R^3$, corresponding to the rings on the shaft A. These are turned out so as to be concentric with the respective orifices and the axis of shaft A within the same.

The operation of the device is as follows: The magnetic armature or shaft A being placed within the pole-pieces of the magnetic system, consisting of the magnets M M' and the pole-pieces N N' and properly centered by the journals D D', receives a flux of constant density from all sides of the adjacent interior rings $R^2$ $R^3$ and is thereby attracted in a general resultant vertical direction. This attraction with magnets of suitable strength is sufficient to entirely counterbalance the force of gravity and suspend the armature or shaft A and the disk B, attached thereto, so as to make it free from any visible means of preventing longitudinal movement.

Such a device when constructed as shown and above described has an extremely small resistance to rotation. It is permanent in that there is practically no liability to the destruction of its journals and has a fixed coefficient of friction. It is therefore a very desirable means of support in all instruments of precision, such as meters and measuring instruments.

In the disk-meter shown the shaft A is connected by a train of wheels to the recording mechanism. The disk B, mounted thereon, is acted upon by coils F F'', which produce magnetic fluxes of different phase acting upon the disk B to produce a movement of rotation in the well-known manner. The fluxes are approximately at right angles to the plane of the disk B and cause an endwise vibration of the shaft A, to which it is attached. If this shaft bore endwise upon the jewels, this vibration would be sufficient to pound the jewels to pieces in a comparatively short time. With our invention there is no endwise bearing, and any end thrust or jar is taken up by the magnetic suspension heretofore described.

We have found that the best results are obtained when the device is constructed so that there is a definite position of the shaft or armature in which the magnetic attraction is maximum. This is attained by the rings R R' and R² R³ on the shaft A and pole-pieces N N', respectively, which are concentric with the axis of the shaft A and the orifices O O'. In this construction the armature or shaft A is attracted into the position in which the projecting rings R R' on the shaft A are in close proximity to the rings R² R³ in the pole-pieces N N', the tendency always being to assume the position in the magnetic circuit of minimum magnetic reluctance. In the construction shown the magnetic field about the armature is always as symmetrical as possible. As a result there are no currents induced in the shaft A or its rings R R' and there is no uncounterbalanced side pull causing a side thrust against the journals D D'.

As shown, the magnets M M' are horseshoe in form. The movement of the disk is controlled as may be necessary by a retarding device. In case the device is to be used as a current-meter a fan may be used. If it is to be connected up as a wattmeter, a magnetic brake is a suitable drag. If it is desired to use a magnetic brake, we may make the magnets M M' each in two parts terminating on opposite sides of the rotating disk, as shown in dotted lines, Fig. 1, and also in Fig. 4.

In such case the magnets M M' serve to suspend the shaft A and also to produce a flux acting as a magnetic brake. In such case we support the lower portions of the magnets M M' independently by blocks, as shown.

What we claim is—

1. The combination of a rotatable shaft of magnetic material and a magnetic system producing a magnetic flux symmetrical thereto and in supporting relation thereto, substantially as described.

2. The combination of a rotatable shaft and bearings for the same, said shaft having a capacity of limited longitudinal movement, and means for producing a magnetic flux in suspending relation to said shaft and symmetrical thereto, substantially as described.

3. The combination of a rotatable shaft having projecting rings of magnetic material concentric with its axis of revolution and a magnetic system supplying a magnetic flux symmetrical with said rings, substantially as described.

4. The combination of a rotatable shaft and bearings for the same permitting of longitudinal movement and a permanent magnet supplying a magnetic flux symmetrical with said shaft and acting upon said shaft in opposition to the force of gravity, substantially as described.

5. The combination of a magnetic shaft, journaled in cylindrical bearings and having projecting rings, of a permanent magnet having a consequent pole surrounding said shaft and its projecting rings in suspending relation thereto, substantially as described.

6. The combination of a magnetic shaft supported in suitable bearings, having two sets of projecting rings, and a magnetic system having a consequent pole, substantially in the plane of one set of rings, and a second consequent pole of opposite polarity, substantially in the plane of the other set of rings, substantially as described.

7. In an electrical measuring device, a shaft carrying a rotating disk of conducting material in combination with a supporting magnetic system, said system supplying a magnetic flux, passing through said disk near its periphery, substantially as described.

WILLIAM STANLEY.
FREDERICK DARLINGTON.

Witnesses:
JOHN F. VAN DEUSEN,
HARRY CONWAY.